(12) United States Patent
Steiner

(10) Patent No.: US 8,925,441 B2
(45) Date of Patent: Jan. 6, 2015

(54) COFFEE MACHINE

(75) Inventor: Adrian Steiner, Weggis (CH)

(73) Assignee: Steiner AG Weggis, Weggis (CH)

( * ) Notice: Subject to any disclaimer, the term of this patent is extended or adjusted under 35 U.S.C. 154(b) by 453 days.

(21) Appl. No.: 13/131,652

(22) PCT Filed: Dec. 5, 2009

(86) PCT No.: PCT/EP2009/008696
§ 371 (c)(1),
(2), (4) Date: Jun. 28, 2011

(87) PCT Pub. No.: WO2010/066387
PCT Pub. Date: Jun. 17, 2010

(65) Prior Publication Data
US 2011/0256289 A1    Oct. 20, 2011

(30) Foreign Application Priority Data

Dec. 10, 2008    (CH) .................................... 1967/08

(51) Int. Cl.
*A47J 31/44*    (2006.01)
(52) U.S. Cl.
CPC .................................. *A47J 31/4485* (2013.01)
USPC ........................................................... 99/293
(58) Field of Classification Search
USPC ........ 99/279–295, 300–304, 433–476, 323.3, 99/275, 323, 327; 426/523, 511, 520, 590, 426/474; 261/28, 152
See application file for complete search history.

(56) References Cited

U.S. PATENT DOCUMENTS

| | | | | |
|---|---|---|---|---|
| 4,137,833 A * | 2/1979 | Yelloz | ............................. | 99/293 |
| 4,565,121 A * | 1/1986 | Ohya et al. | ..................... | 99/281 |
| 4,641,012 A * | 2/1987 | Roberts | ......................... | 392/451 |
| 4,871,089 A * | 10/1989 | Rader et al. | ..................... | 222/54 |
| 5,014,611 A * | 5/1991 | Illy et al. | ......................... | 99/280 |
| 5,498,757 A * | 3/1996 | Johnson et al. | ............... | 426/520 |
| 5,551,331 A * | 9/1996 | Pfeifer et al. | .................. | 99/280 |
| 5,957,033 A | 9/1999 | In-Albon | | |
| 6,006,654 A * | 12/1999 | Pugh | ............................... | 99/293 |
| 7,017,474 B2 | 3/2006 | Comte | | |
| 7,178,453 B2 | 2/2007 | In-Albon | | |
| 7,527,818 B2 | 5/2009 | Dirren | | |
| 8,357,416 B2 | 1/2013 | Schindler et al. | | |
| 2004/0187693 A1 * | 9/2004 | Fuchs | .............................. | 99/275 |
| 2008/0216665 A1 * | 9/2008 | Hoehne et al. | .................. | 99/293 |
| 2008/0245238 A1 * | 10/2008 | Huiberts | ......................... | 99/300 |
| 2008/0247740 A1 * | 10/2008 | Rijskamp et al. | ............. | 392/451 |

FOREIGN PATENT DOCUMENTS

| | | |
|---|---|---|
| EP | 1593330 A1 | 11/2005 |
| WO | 9727793 | 8/1997 |

* cited by examiner

*Primary Examiner* — Dana Ross
*Assistant Examiner* — Renee L Miller
(74) *Attorney, Agent, or Firm* — Brian Roffe

(57) ABSTRACT

A coffee machine including a boiler for producing hot water and steam for the preparation of coffee or coffee-containing beverages. A coiled tubing is located in the boiler for producing hot milk or milk froth. Thus, no separate heating element is required for producing the hot milk or milk froth, as the milk or milk froth is heated by the water heated in the boiler for preparing the coffee. The coiled tubing is connected alternately to a milk container and a rinsing water source, so that potential milk residue is flushed out after each milk heating process. A predetermined amount of milk or rinsing water is fed to the coiled tubing by a pump. Thus the milk and rinsing water usage is optimized and the energy consumption is reduced.

19 Claims, 2 Drawing Sheets

COFFEE MACHINE

FIELD OF THE INVENTION

The invention relates to a coffee machine comprising a boiler for producing hot water and steam for the preparation of coffee or milk drinks.

BACKGROUND OF THE INVENTION

Coffee machines of this type are known in a wide variety of embodiments. In EP 0 761 150, for example, this type of coffee machine is described which is provided with an outlet head for the prepared coffee and outlet taps for extracting hot water and steam. In practice, however, multi-functional devices are often asked for which, in addition to coffee, also produce hot and cold milk or milk froth. For this purpose they require two different units, namely one for producing coffee, and the other for producing milk or milk froth. Such devices are structurally complex, and also have relatively high energy consumption due to the separate heating elements for the preparation of the coffee on the one hand and the hot milk and the milk froth on the other hand, especially as in many cases a continuous flow heater is used for this purpose. For this reason they are moreover susceptible to faults because experience has shown that the milk is can easily stick in the pipes of the continuous flow heater.

OBJECTS AND SUMMARY OF THE INVENTION

The object underlying the invention is to avoid these disadvantages and to provide a coffee machine of the type specified at the start which produces both coffee and hot or cold milk or milk froth drinks in an energy-saving, low-consumption and fault-free way. The invention also relates to a method particularly suitable for this purpose.

This object is achieved according to the invention in that the coffee machine is provided with a coiled tubing disposed in the boiler of the coffee machine for producing hot milk or milk froth. With this type of arrangement one can dispense with a separate heating element for the preparation of the hot milk or milk froth as the milk or milk froth in the coiled tubing is heated by the water heated for preparing the coffee. This is space-saving and also has a cost-saving effect.

The invention further makes provision such that the coiled tubing can be connected alternately by a valve to a milk container or a water source. In this way it is possible with small structural complexity to rinse the coiled tubing free of any milk residue after every milk heating process, and to maintain fault-free operation under impeccably hygienic conditions.

Provision is made here according to the invention within the framework of a structurally simple arrangement such that the pump of the coffee machine can alternately convey milk or water, the coiled tubing being connectable to the milk container or the water source by a directional valve controlled by the pump.

Moreover, the invention makes provision such that the pump co-operates with a passage control by means of which the quantity of milk or water respectively delivered to the coiled tubing is controlled. By means of the controlled metered delivery the milk is and water consumption is restricted to what is necessary.

Within this context it is advantageous for control if the feed pump is in the form of a geared pump, the passage control being adjustable dependently upon the rotation speed of the pump.

The invention also makes provision such that cold milk or cold milk froth can also be produced. By means of an additional valve the cold milk is not conveyed into the coiled tubing, but directly into the outlet.

Advantageously the coiled tubing can be connected to a waste water outlet pipe which can be connected to the latter by a directional valve operable by the passage control. The device is thus given a separate outlet for the dirty rinsing water which can optionally also be used for discharging the cleaning water conveyed through the coiled tubing.

It is advantageous structurally and for heating if the boiler is in the form of a preferably cylindrical tank with a heating coil, the coiled tubing being fitted in said boiler above the heating coil.

Moreover, it is advantageous if the connections of the coiled tubing and the heating coil are fitted onto a cover of the boiler. Fitting and removal of the heating coil and the coiled tubing is thus greatly facilitated.

The boiler according to the invention can also be fitted in existing coffee machines as a component of a hot milk or milk froth dispensing unit. The separate heating device for the milk or the milk froth which would otherwise be necessary is thus dispensed with.

In order to optimise the consumption of milk, rinsing water and energy, the is invention makes provision such that during operation a pre-specified quantity of milk or a pre-specified quantity of rinsing water is alternately conveyed through the coiled tubing.

With milk heating devices with a geared pump as a feed pump, within the context of easily adjustable control of the pre-specified passage quantity it is advantageous if the latter is determined by the rotation speed of the pump dependently upon time.

Moreover, the invention makes provision such that when the pump is at a standstill the coiled tubing is filled with rinsing water, and upon starting up the pump the latter is discharged as waste water. In this way it is guaranteed that after extracting hot milk or milk froth both the coiled tubing and the outlet pipe remain free of milk residue because practically no milk can stick here now.

Within this context provision is also made according to the invention such that after taking the boiler out of operation, for example with longer operating pauses, cleaning water with or without cleaning agents automatically circulates through the coiled tubing.

BRIEF DESCRIPTION OF THE DRAWINGS

In the following the invention is described in greater detail by means of an exemplary embodiment with reference to the drawings. These show as follows.

DETAILED DESCRIPTION OF THE INVENTION

Figure 1:
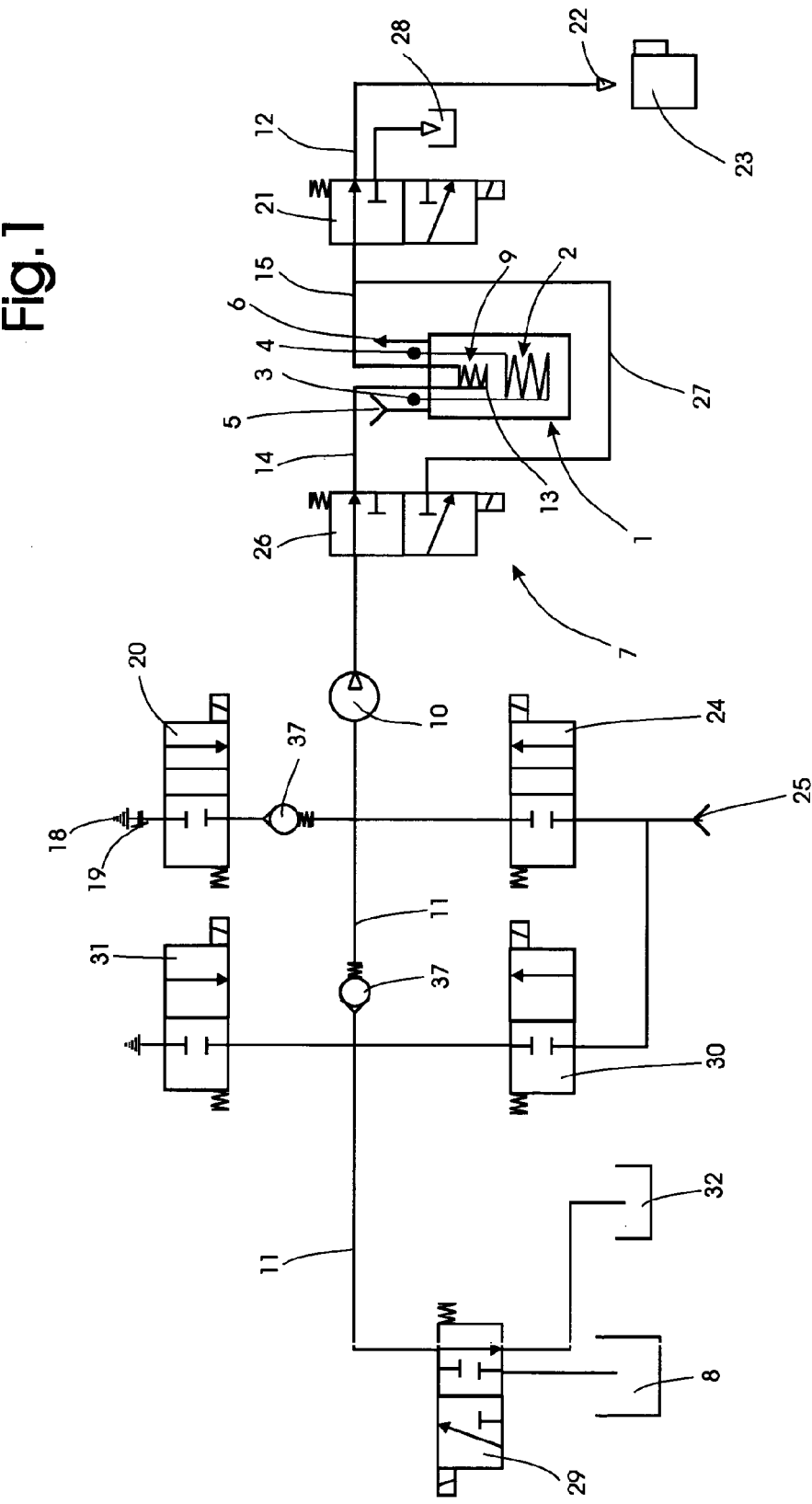
FIG. 1 shows a coffee machine according to the invention comprising a device for producing hot and cold milk or milk froth, illustrated diagrammatically.

The coffee machine shown in FIG. 1 has a water heating apparatus known in its own right of which in FIG. 1 only the boiler 1, the heating coil 2 with connections 3, 4 and the water feed and outlet pipes 5, 6 are visible.

Moreover, the coffee machine is equipped with a device 7 for producing hot or cold milk or milk froth which is made up of a milk container 8, a milk heating apparatus 9, a bypass valve 26 for diverting the cold milk or milk froth via the pipe 27 to the outlet 22, and a pump 10 together with the corresponding feed and outlet pipes 11, 12.

The milk heating apparatus 9 is equipped with a coiled tubing 13 which is fitted in the boiler 1 above the heating coil 2 and can be connected to the feed and outlet pipes 11, 12 by connections 14, 15.

Figure 2:
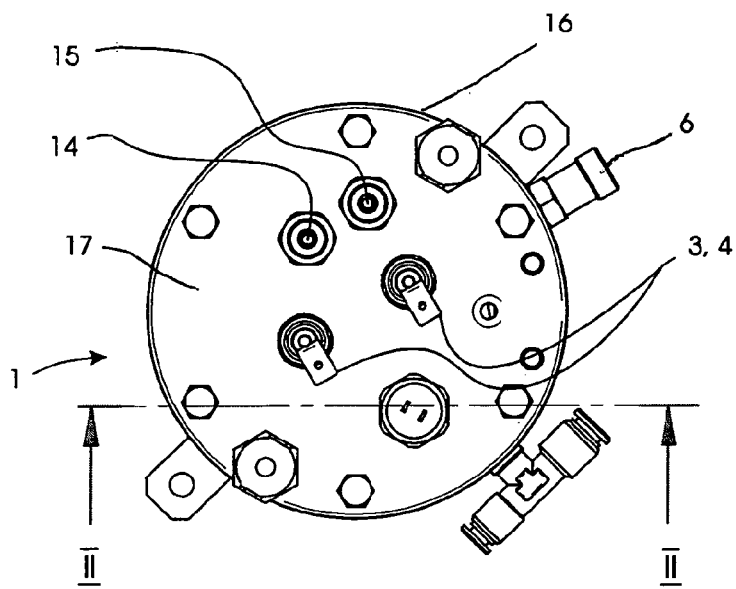
FIG. 2 is a top view of the boiler of the coffee machine of FIG. 1, in an enlarged illustration.
Figure 3:
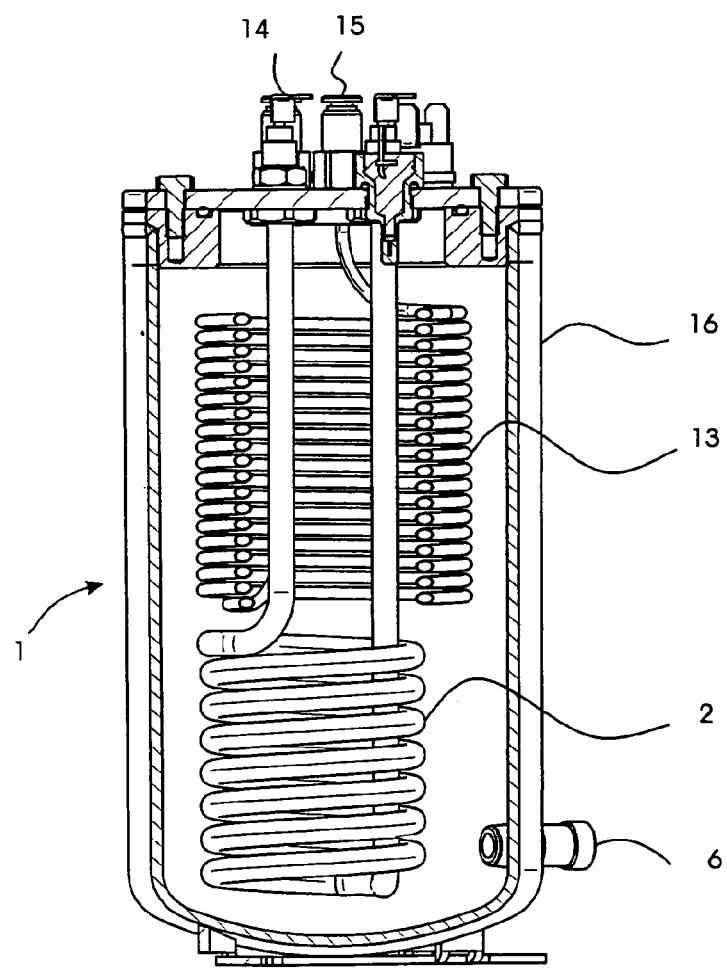
FIG. 3 is a section along line II-II in FIG. 2.

As can be seen from FIG. 2 and FIG. 3, the boiler 1 is in the form of an approximately cylindrical tank 16 with a cover 17. Fitted to the latter are the connections 3, 4 of the heating coil 2 and the connections 14, 15 of the coiled tubing 13. In this way all of the connections are easily accessible. Moreover, it is easy, if so required, to change the heating coil and/or the coiled tubing after removing the cover 17.

A specific quantity of air can be mixed into the milk for frothing by means of an air feed pipe 18 with an adjustable air quantity regulator 19. In order to open or block the air feed an actuating valve 20 is provided.

The milk is sucked up by the pump 10 and conveyed through the coiled tubing 13 where it is heated to the desired temperature by heat exchange with the hot water of the boiler. Next it is fed through the outlet pipe 12 via a restrictor valve 21 to a hot milk or milk froth dispensing outlet 22, and is collected here in an appropriate container 23.

In order to maintain constantly fault-free operation, a specific quantity of milk or milk froth and a specific quantity of rinsing water is alternately conveyed from a source 25 to the coiled tubing 13 via a directional valve 24. It is therefore guaranteed that after the extraction of hot milk or milk froth the coiled tubing 13 is rinsed through each time, and so is freed from any milk residue so that the machine is constantly functioning is under impeccably hygienic conditions. The same also applies to the cold milk pipe 27 which can be disconnected by the valve 26 for rinsing. Return valves 37 ensure that the milk is conveyed through the pump.

The directional valve 24 is operated by means of a passage control (not shown). The used rinsing water is discharged via the directional valve 21 which is operated in time with the directional valve 24 by the passage control (not shown).

The respective quantity of milk or milk froth conveyed through can be adjusted by the passage control according to the rotation speed of the pump 10 dependently upon time. In this way it is possible to optimise the consumption of milk and rinsing water. Moreover, the heat requirement of the coiled tubing 13 is also reduced.

When the machine is placed in operation the coiled tubing 13 is filled with rinsing water which is removed as waste water at the push of a button upon starting up the feed pump 10. The pump 10 then conveys as much milk or milk froth as is pre-specified by the passage control, and is determined by the rotation speed of the pump dependently upon time. As soon as the milk or milk froth has passed through the coiled tubing 13 and the outlet 22 into the cup or similar container 23, directly afterwards a pre-specified quantity of rinsing water is passed through again, the excess water flowing out again as waste water 28. When the feed pump 10 is stopped, the rinsing water then remains in the coiled tubing and in the pipe.

For permanent cleaning of the coiled tubing after taking the machine out of operation cleaning fluid can be conveyed from a source 8 into the feed pipe 11 via a cleaning valve 29, and be pumped by means of the pump 10 into the outlet pipe 12, so that for example every evening after the end of operation cleaning liquid circulates through the coiled tubing and the pipes connected to the latter, and is thus kept free of milk residue.

Furthermore, there is provided at the water inlet 25 a directional valve 30 which is enables back-rinsing in the pipe 11. Furthermore, the pipe 11 can be emptied by the vent valve 31 or into the waste water container 32.

In order to discharge the used rinsing and cleaning water a waste water outlet pipe 28 is provided. The latter can be connected to the outlet pipe 15 of the coiled tubing 13 via the directional valve 21.

By using the boiler 1 to heat the milk or the milk froth, there is less energy consumption in comparison to machines with two separate heating elements for the coffee on the one hand and for the milk or milk froth on the other hand. The fact that according to the invention the milk or the milk froth is fed, metered, to the coiled tubing, also substantially contributes to this.

Moreover, the measure also contributes to reducing the physical extent of the device because for example a separate flow heater for heating the milk or the milk froth can thus be dispensed with. It is also known to be a disadvantage of this type of continuous flow heater that one would frequently have to take it apart in order to clean its inside thoroughly.

Needless to say, it is possible within the framework of the invention to provide for example a heating rod or a wall heater in the boiler wall instead of the heating coil 2 in the boiler. Obviously it is also possible to fit the boiler according to the invention in already existing coffee machines.

The invention claimed is:

1. A coffee machine, comprising:
a boiler for producing hot water and steam for preparation of coffee or milk drinks, the boiler including an interior for receiving water;
a coiled tubing disposed in the interior of the boiler for producing hot milk or milk froth;
an inlet through which water flows into the interior of the boiler; and
an outlet arranged on the boiler in flow communication with the interior of the boiler to enable hot water to flow from the interior of the boiler through the outlet to be used for the coffee or milk drinks,
wherein the outlet is an outlet pipe extending through a peripheral wall of the boiler and the only outlet for hot water and steam from the boiler is through the outlet pipe.

2. The coffee machine according to claim 1, wherein the coiled tubing is selectively and alternatively connectable to a milk container or a rinsing water source.

3. The coffee machine according to claim 2, further comprising a pump configured to alternately convey milk from the milk container or rinsing water from the rinsing water source, the coiled tubing being connectable to the milk container or to the rinsing water source by a directional valve controlled by the pump.

4. The coffee machine according to claim 3, wherein the pump co-operates with a passage control by means of which the quantity of milk or rinsing water respectively delivered to the coiled tubing is controlled.

5. The coffee machine according to claim 4, wherein the pump is in the form of a geared pump, the passage control being adjustable dependent upon rotation speed of the pump.

6. The coffee machine according to claim 1, further comprising a pipe for conveying cleaning water and to which the coiled tubing is selectively connectable.

7. The coffee machine according to claim 4, further comprising a waste water outlet pipe to which the coiled tubing is selectively connectable by a directional valve operable by the passage control.

8. The coffee machine according to claim 1, wherein the boiler is in the form of a cylindrical tank with a heating coil, the coiled tubing being arranged in the boiler above the heating coil.

9. The coffee machine according to claim 8, further comprising a cover for the tank and connections of the heating coil and the coiled tubing fitted onto the cover of the tank.

10. The coffee machine according to claim 1, wherein the boiler with the coiled tubing and a bypass valve with a pipe for cold milk form a component of a unit dispensing hot and cold milk or milk froth.

11. The coffee machine according to claim 1, further comprising a heating coil in the boiler for heating water when contained in the interior of the boiler and to be used for the coffee or milk drinks, such that the coiled tubing is heated by water to be used for the coffee or milk drinks.

12. The coffee machine according to claim 11, wherein the heating coil is arranged in the interior of the boiler.

13. The coffee machine according to claim 1, further comprising:
a milk feed conduit for conveying milk from a milk source;
a rinsing water conduit for conveying rinsing water from a rinsing water source; and
a control unit that controls flow through the coiled tubing, the control unit being configured to selectively alternatively connect the coiled tubing to the milk feed conduit or to the rinsing water conduit to either provide milk flow through the coiled tubing or provide rinsing water flow through the coiled tubing.

14. The coffee machine according to claim 13, wherein the control unit comprises a pump and a valve controlled by the pump.

15. The coffee machine according to claim 1, further comprising:
a milk feed conduit for conveying milk from a milk source; and
a control unit that controls flow through the coiled tubing, the control unit being configured to connect the coiled tubing to the milk feed conduit and meter the flow of milk through the coiled tubing.

16. The coffee machine according to claim 15, wherein the control unit comprises a pump and a valve controlled by the pump.

17. A coffee machine, comprising:
a boiler for producing hot water and steam for preparation of coffee or milk drinks, the boiler including an interior for receiving water;
a coiled tubing disposed in the interior of the boiler for producing hot milk or milk froth;
an inlet through which water flows into the interior of the boiler;
an outlet arranged on the boiler in flow communication with the interior of the boiler to enable hot water to flow from the interior of the boiler through the outlet to be used for the coffee or milk drinks; and
a heating coil arranged in the interior of the boiler,
the interior of the boiler including only the coiled tubing and the heating coil such that the only outlets from the boiler are the flow of water and steam through the outlet and the flow of hot milk or milk froth through the coiled tubing.

18. The coffee machine according to claim 1, wherein the outlet is arranged at a bottom of the boiler.

19. The coffee machine according to claim 17, wherein the outlet is an outlet pipe extending through a peripheral wall of the boiler.

* * * * *